G. HENSLEY.
FRUIT HARVESTER.
APPLICATION FILED APR. 29, 1908.

906,626.

Patented Dec. 15, 1908.

WITNESSES:

INVENTOR
George Hensley.
BY
Thomas L. Ryan
ATTORNEY

UNITED STATES PATENT OFFICE.

GEORGE HENSLEY, OF MOUNT PLEASANT TOWNSHIP, DELAWARE COUNTY, INDIANA.

FRUIT-HARVESTER.

No. 906,626.  Specification of Letters Patent.  Patented Dec. 15, 1908.

Application filed April 29, 1908. Serial No. 429,797.

*To all whom it may concern:*

Be it known that I, GEORGE HENSLEY, a citizen of the United States, residing at Mount Pleasant township, Delaware county, Indiana, have invented a new and useful Fruit-Harvester, of which the following is a specification.

This invention relates to improvements in fruit harvesters and has for its object to provide a device of the kind referred to which will be reliable, easy of manipulation and of simple construction.

My invention consists of the construction, combination and arrangement of parts described and claimed herein, and is illustrated in the accompanying drawings.

Figure 1:
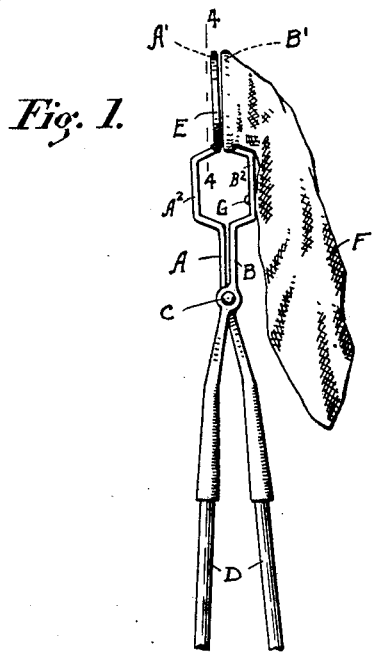
Figure 2:
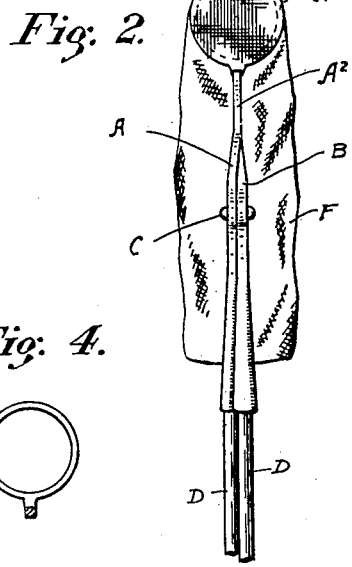
Figure 4:
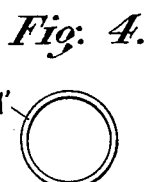
Figure 3:
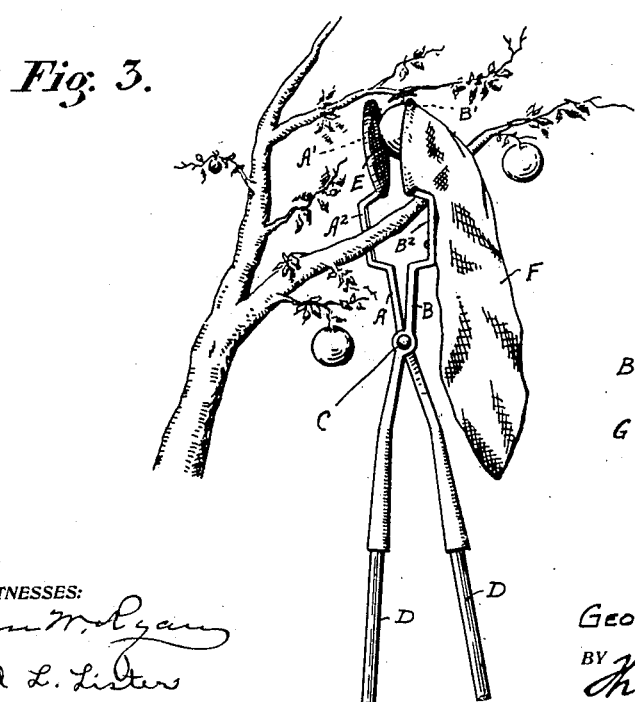
Figure 5:
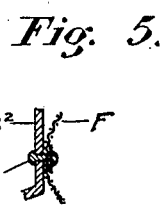

Figure 1 and Fig. 2 are side views, and Fig. 3 is a perspective view of my invention, in each of the said views the main portions of the handles being broken away. Fig. 4 is a sectional view taken on the line 4—4 Fig. 1 the integument E being not shown. Fig. 5 is a detached sectional view showing in detail, the rivet G.

Similar characters of reference refer to like parts throughout the several views.

A and B designate complemental members made of metal and hingedly secured together by the pin C. Each of these complemental members is terminated at its upper portion in such shape as to provide an open frame. The ring shaped form of frames shown, and which I have designated as $A^1$ and $B^1$, are preferable. Below each of these frames $A^1$ and $B^1$ the offset portion $A^2$ and $B^2$ are formed. The lower end of each of the complemental members is of suitable form to have secured thereto, the handles D. These handles D may be of any desired length and are shown in the drawings as having the free-end portion broken away.

A desirable form for the lower ends of the complemental members is to make the same of enlarged diameter as shown, each is provided with a tapered aperture into which the handles are tightly secured by being driven therein in the usual way.

Secured to the frame $A^1$ preferably by stitching is the integument E made of suitable flexible fabric such as canvas.

F designates a bag of ample proportions that has the edges of its open end secured continuously about the frame $B^1$. The under-portion of the bag is secured by the rivet G to the offset-portion $B^2$ whereby that portion of the bag that will be immediately adjacent to the secured upper portion, will not swing out of alinement with the complemental member to which it is secured.

It will be understood that some change in the general form and proportion of the parts may be made within the scope of the claim without departing from the spirit or sacrificing any of the advantages of the invention.

My improved fruit-harvester is of especial utility in the harvesting of apples, pears, and the like fruits that grow on trees where frequently the fruit will hang in close proximity above limbs and branches which are greatly in the way and which hinder the successful operation of fruit harvesting devices hitherto devised.

The mode of the use and practice of my improved harvester will be obvious upon inspection of Fig. 3 of the drawings. The handles D are made of suitable length so that the device may be projected by the manipulator to a height sufficient to reach into any portion of the tree. The device is so projected and disposed with the frames $A^1$ and $B^1$ apart that the fruit is engaged by the frame $B^1$; the handles are then pressed toward each other which causes the integument of the frame $A^1$ to bear against the fruit. By reason of the flexibility of this integument the fruit will not be marred or mutilated in the least. By further movement of the handles the frames $A^1$ and $B^1$ are brought together and the stem of the fruit will be broken and the latter will fall into the bag.

Where it is desired to gather in fruit, that may be pendent immediately above a limb or branch as shown in Fig. 3, the offset portions $A^2$ and $B^2$ of the complemental members make possible the gathering of the fruit in the manner as just described.

What I claim as my invention and desire to secure by Letters Patent is—

In a fruit gathering implement, the combination of a pair of pivotally connected complemental members terminated in rings adapted to register with each other, the said complemental members being formed with offsets in each so that there will be an opening between said members immediately underneath said rings when they are brought together, of an integument secured across one of said rings and having a plane surface, a flexible receptacle carried by the device and having its mouth secured continuously about the opposite ring, all arranged and composed, substantially as described.

In testimony whereof I have signed my name to this specification in the presence of two subscribing witnesses.

GEORGE HENSLEY.

Witnesses:
 ETHEL L. LISTER,
 THOMAS L. RYAN.